US012705582B2

(12) United States Patent
Sher

(10) Patent No.: US 12,705,582 B2
(45) Date of Patent: Aug. 11, 2026

(54) SYSTEMS AND METHODS FOR TRACKING EQUIPMENT THROUGH USE OF DISTRIBUTED LEDGER TECHNOLOGIES AND NON-FUNGIBLE TOKENS

(71) Applicant: Uptime Assets LLC, North Pompano, FL (US)

(72) Inventor: Matthew Sher, North Pompano, FL (US)

(73) Assignee: Uptime Assets LLC

(*) Notice: Subject to any disclaimer, the term of this patent is extended or adjusted under 35 U.S.C. 154(b) by 264 days.

(21) Appl. No.: 18/199,193

(22) Filed: May 18, 2023

(65) Prior Publication Data

US 2024/0386390 A1 Nov. 21, 2024

(51) Int. Cl.
*G06Q 30/00* (2023.01)
*G06Q 10/20* (2023.01)

(52) U.S. Cl.
CPC .................................... *G06Q 10/20* (2013.01)

(58) Field of Classification Search
CPC ............................... G06Q 10/20; G06Q 30/08
See application file for complete search history.

(56) References Cited

U.S. PATENT DOCUMENTS 10,713,737 B1 * 7/2020 Blackburn ............. G06Q 50/08
2007/0150295 A1 * 6/2007 Dawson ................ G06Q 40/00 705/35
2014/0330663 A1 * 11/2014 Chambers .......... G06Q 30/0283 705/26.3
2015/0112828 A1 * 4/2015 Qasem .................. G06Q 30/08 705/26.3
2015/0221143 A1 * 8/2015 Kim .................... G07C 5/0816 701/29.3
2019/0065973 A1 * 2/2019 Elwakeel ........... G05B 23/0229
2019/0288847 A1 * 9/2019 Beckmann .......... G06F 16/2246
2019/0370847 A1 * 12/2019 Khan .................. G06Q 20/204
2020/0294128 A1 * 9/2020 Cella ..................... H04L 9/3239
2021/0233672 A1 * 7/2021 Patil ........................ H04L 63/00
2022/0368541 A1 * 11/2022 Palatov ................. H04L 9/3268
2022/0383152 A1 * 12/2022 Kallur Palli Kumar ..................... G06N 7/01
2023/0176550 A1 * 6/2023 Cella ................. G05B 23/0243 700/117

(Continued)

FOREIGN PATENT DOCUMENTS

WO 2021/176472 A1 9/2021
WO 2022/236064 A3 12/2022

OTHER PUBLICATIONS

Deep and machine learning approaches for forecasting the residual value of heavy construction equipment: a management decision support model. Published in: Engineering Construction & Architectural Management (09699988), 2022 (Year: 2022).*

(Continued)

*Primary Examiner* — Matthew T Sittner
(74) *Attorney, Agent, or Firm* — Sigma Law Group LLC

(57) ABSTRACT

Methods and systems for tracking equipment are disclosed. Some embodiments may include: receiving an electronic identifier associated with a piece of equipment, retrieving the one or more data elements from a distributed ledger, generating an updated resale value for the piece of equipment associated with the electronic identifier, based at least in part on the one or more data elements and providing the updated resale value to a user.

19 Claims, 9 Drawing Sheets

(56) References Cited

U.S. PATENT DOCUMENTS

2023/0259992 A1* 8/2023 Gopal ................ G06Q 10/0637
705/347

OTHER PUBLICATIONS

W. Wang et al., "Relay protection service support platform architecture and data flow based on big data technology," 2019 (Year: 2019).*

"IEEE Recommended Practice for Determining the Impact of Preventative Maintenance on the Reliability of Industrial and Commercial Power Systems," 2018 (Year: 2018).*

International Search Report and Written Opinion, dated Sep. 19, 2024, issued in corresponding International Application No. PCT/US24/30034.

* cited by examiner

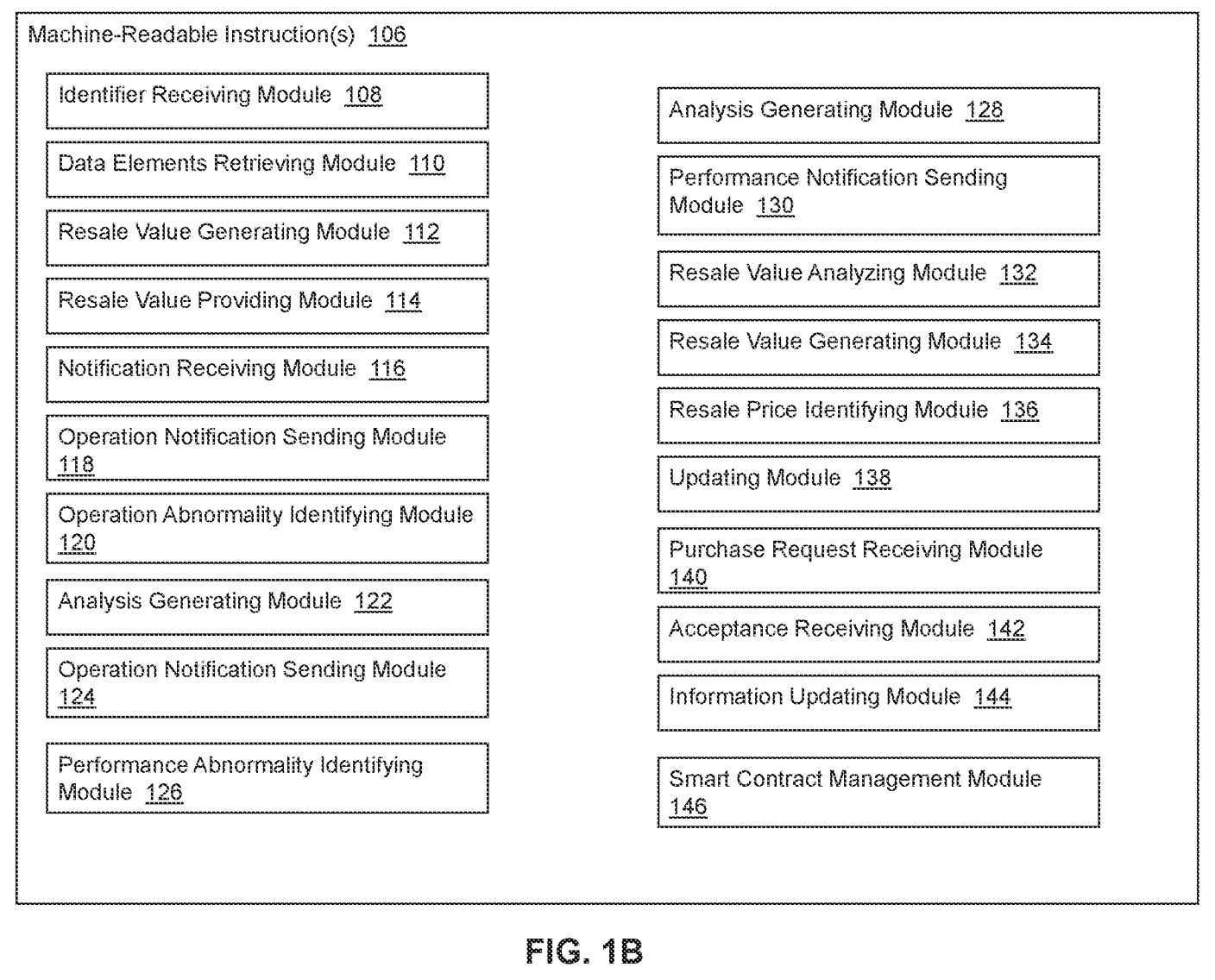

Machine-Readable Instruction(s) 106

Identifier Receiving Module 108

Data Elements Retrieving Module 110

Resale Value Generating Module 112

Resale Value Providing Module 114

Notification Receiving Module 116

Operation Notification Sending Module 118

Operation Abnormality Identifying Module 120

Analysis Generating Module 122

Operation Notification Sending Module 124

Performance Abnormality Identifying Module 126

Analysis Generating Module 128

Performance Notification Sending Module 130

Resale Value Analyzing Module 132

Resale Value Generating Module 134

Resale Price Identifying Module 136

Updating Module 138

Purchase Request Receiving Module 140

Acceptance Receiving Module 142

Information Updating Module 144

Smart Contract Management Module 146

FIG. 1B

SYSTEMS AND METHODS FOR TRACKING EQUIPMENT THROUGH USE OF DISTRIBUTED LEDGER TECHNOLOGIES AND NON-FUNGIBLE TOKENS

FIELD OF THE DISCLOSURE

The present disclosure relates to systems and methods for tracking equipment through the use of distributed ledger technologies, such as Blockchain, and non-fungible tokens (NFTs).

BACKGROUND

Large capital equipment, such as assets in the commercial foodservice equipment space and other such commercial and retail equipment verticals, can be costly to obtain, maintain, operate and transfer on the secondary markets. Especially when it comes to the secondary market, the quality and condition of these generally expensive pieces of equipment can be an unknown, as adequate maintenance and service records are rarely available over long periods of time, particularly if the equipment has changed hands multiple times, even where the equipment changes hands but stays at the same location.

Many industries using these types of equipment have high percentages of turnover in a relatively short period of time. For instance, the restaurant industry has a high rate of failure within the first two years of operation. Given the lifespan on commercial foodservice equipment is greater than ten years, if serviced and maintained properly. When these restaurants fail, the equipment will frequently go up for resale on the secondary market. This may happen several times in the lifespan of a single piece of equipment, leaving little or no trace of how the equipment was maintained or operated during such a period of time.

This can cause significant expense to those who purchase these pieces of equipment on the secondary market, as they can be prone to fail. This has the dual effect of lowering the resale value of any equipment on the secondary market, and also causing those buyers to suffer unknown or unexpected replacement or repair costs in the future for purchasing ill maintained or inappropriately operated untrustworthy equipment.

Additionally, secondary market equipment repair costs may be increased, due to a lack of qualified skilled labor equipped to diagnose and fix older equipment and the increased probability technicians will not have adequate replacement parts on hand to repair older equipment. Delays for ordering appropriate replacement parts, and return trips for repairing the same piece of equipment directly leads to higher overall costs, both economically and environmentally. This is especially disastrous when there is already a severe lack of skilled laborers. Having these laborers do multiple trips to the same jobsite to fix equipment that could have been repaired in the first trip exacerbates these matters.

Therefore, there is a need in the art to provide methods and systems capable of ensuring equipment can be maintained and monitored effectively after first sale, and records of such equipment can be tracked and validated over its lifespan, in order to increase transparency, predictability and longevity of the equipment and provide for more stable and higher resale values on the secondary market.

SUMMARY

One aspect of the present disclosure relates to a system and method for tracking equipment; such as tracking maintenance, operation, repair, failure, and ownership of the equipment. According to embodiments of the present invention, this is accomplished through the use of distributed ledger technologies and NFTs. Certain embodiments of the systems and methods detailed herein may further utilize smart contracts, machine learning, artificial intelligence, and other technologies, to ensure optimal utilization and maintenance of the equipment, as well as providing for optimized procedures for generating appropriate resale values for such equipment on the secondary market. In certain embodiments, methods and systems detailed herein may drastically reduce or eliminate inflated expenses by introducing equipment lifecycle performance predictability while simultaneously providing greater transparency related to the equipment.

The method may include receiving an electronic identifier associated with a piece of equipment. The electronic identifier comprises information associated with one or more data elements selected from a set of data elements comprising, a service history, input from one or more equipment sensors, equipment performance data, abnormality alert data, equipment breakdown data, and a smart contract data. The method may include retrieving the one or more data elements from a distributed ledger. The method may include generating an updated resale value for the piece of equipment associated with the electronic identifier, based at least in part on the one or more data elements. The method may include providing the updated resale value to a user.

Another aspect of the present disclosure relates to a system for tracking equipment. The system may include one or more hardware processors configured by machine-readable instructions for tracking equipment. The machine-readable instructions may be configured to receive an electronic identifier associated with a piece of equipment. The electronic identifier comprises information associated with one or more data elements selected from a set of data elements comprising, a service history, input from one or more equipment sensors, equipment performance data, abnormality alert data, equipment breakdown data, and a smart contract data. The machine-readable instructions may be configured to retrieve the one or more data elements from a distributed ledger. The machine-readable instructions may be configured to generate an updated resale value for the piece of equipment associated with the electronic identifier, based at least in part on the one or more data elements. The machine-readable instructions may be configured to provide the updated resale value to a user.

BRIEF DESCRIPTION OF THE DRAWINGS

FIGS. 1A and 1B illustrate a system configured for tracking equipment, in accordance with an embodiment of the present invention.

DETAILED DESCRIPTION

Figure 1A:
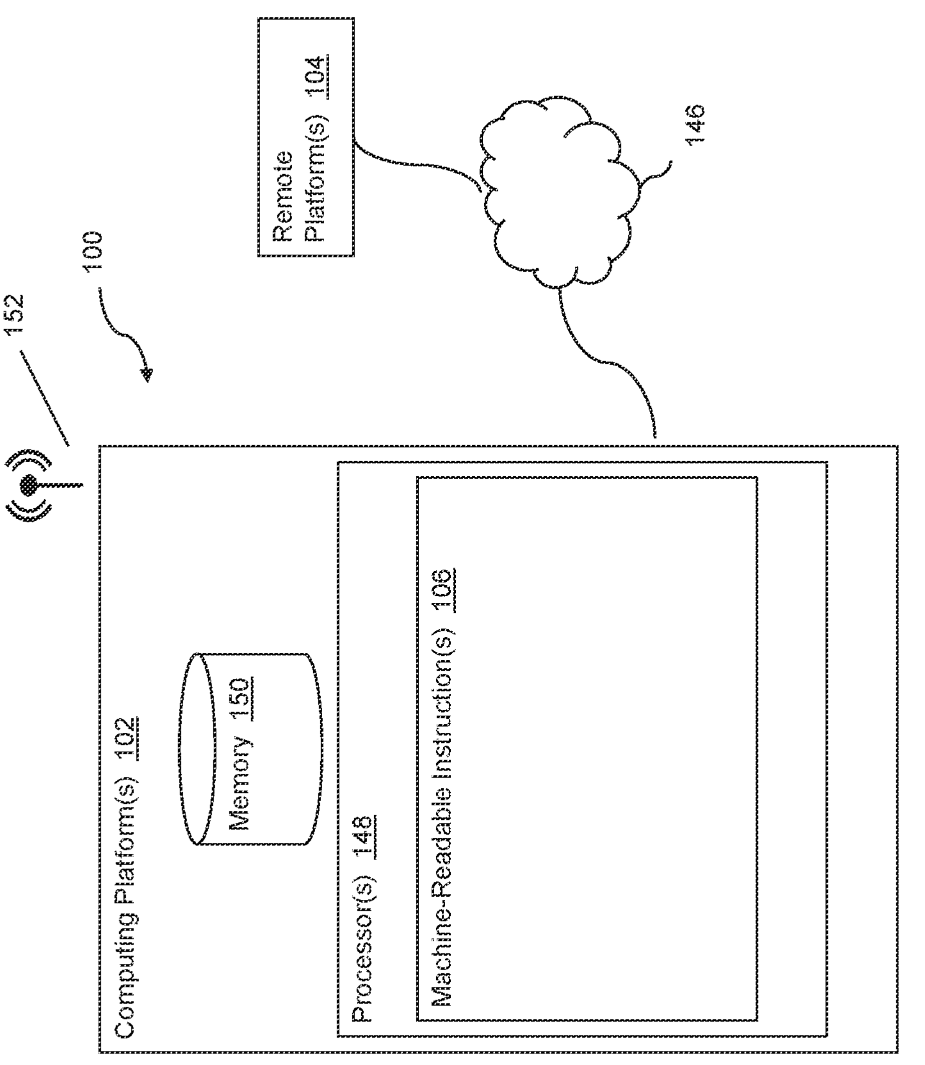

FIG. 1 illustrates a system configured for tracking equipment, in accordance with one or more embodiments. In some cases, system 100 may include one or more computing platforms 102. The one or more remote computing platforms 102 may be communicably coupled with one or more remote platforms 104. In some cases, users may access the system 100 via remote platform(s) 104.

The one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of identifier receiving module 108, data elements retrieving module 110, resale value generating module 112, resale value providing module 114, notification receiving module 116, operation notification sending module 118, operation abnormality identifying module 120, analysis generating module 122, operation notification sending module 124, performance abnormality identifying module 126, analysis generating module 128, performance notification sending module 130, resale value analyzing module 132, resale value generating module 134, resale price identifying module 136, updating module 138, purchase request receiving module 140, acceptance receiving module 142, information updating module 144, smart contract management module 146, and/or other modules. One of ordinary skill in the art would appreciate that embodiments of the present invention could use additional modules, a subset of the above modules, or combinations of various modules in different formats, and embodiments of the present invention are contemplated for any such variations.

Identifier receiving module 108 may be configured to receive an electronic identifier associated with a piece of equipment. The electronic identifier comprises information associated with one or more data elements selected from a set of data elements comprising, a service history, input from one or more equipment sensors, equipment performance data, abnormality alert data, equipment breakdown data, and a smart contract data. Data elements retrieving module 110 may be configured to retrieve the one or more data elements from a distributed ledger. Resale value generating module 112 may be configured to generate an updated resale value for the piece of equipment associated with the electronic identifier, based at least in part on the one or more data elements. Resale value providing module 114 may be configured to provide the updated resale value to a user.

In some cases, the electronic identifier may be a non-fungible token and the input from one or more equipment sensors comprises information from sensors selected from the group comprising one or more voltage sensors, one or more amperage sensors, one or more energy sensors, one or more temperature sensors, one or more gas leak sensors, one or more power failure sensors, and one or more time of operation sensors.

Notification receiving module 116 may be configured to receive a notification of an equipment operation abnormality, associated with the piece of equipment. Operation notification sending module 118 may be configured to send an equipment operation abnormality notification to one or more of an owner of the piece of equipment and a repair person.

Operation abnormality identifying module 120 may be configured to identify an equipment operation abnormality associated with the piece of equipment. Analysis generating module 122 may be configured to generate an analysis of the equipment operation abnormality. Operation notification sending module 124 may be configured to send an equipment operation abnormality notification to one or more of an owner of the piece of equipment and a repair person, based at least in part on the analysis of the equipment operation abnormality. In some cases, the repair person may be identified, based at least in part on a type of equipment operation abnormality identified in the analysis of the equipment operation abnormality.

Performance abnormality identifying module 126 may be configured to identify an equipment performance abnormality associated with the piece of equipment. Analysis generating module 128 may be configured to generate an analysis of the equipment performance abnormality. Performance notification sending module 130 may be configured to send an equipment performance abnormality notification to one or more of an owner of the piece of equipment and a repair person, based at least in part on the analysis of the equipment performance abnormality.

Resale value analyzing module 132 may be configured to analyze the updated resale value for the piece of equipment. Resale value generating module 134 may be configured to generate an optimized resale value for the piece of equipment.

Resale price identifying module 136 may be configured to identify a final resale price of the piece of equipment. Updating module 138 may be configured to update said machine learning model based at least in part on the optimized resale value for the piece of equipment and the final resale price of the piece of equipment.

Purchase request receiving module 140 may be configured to receive a purchase request from a first potential owner of the one or more potential owners. Acceptance receiving module 142 may be configured to receive an acceptance of the purchase request from the owner of the piece of equipment. Information updating module 144 may be configured to update information associated with the electronic identifier associated with the piece of equipment such that the first potential owner is made the new owner of the piece of equipment. In some cases, a value associated with the purchase request exceeds the value of one or more other purchase requests received from the one or more potential owners.

According to embodiments of the present invention, smart contract management module 146 may be configured to perform multiple functions related to smart contracts used in conjunction with the various systems and methods described herein. For instance, the smart contract management module 146 may be configured perform one or more of the following tasks: generate a new smart contract to be associated with a piece of equipment; edit existing smart contracts; take an automated action based on the rules/elements associated with the smart contract; integrate into a smart contract financial benefits, such as incentives for brand loyalty; and any combination thereof. One of ordinary skill in the art would appreciate the smart contract management module 146 may be able to perform a wide variety of functions related to smart contracts, and embodiments of the present invention are contemplated for use with any of such functions.

In some cases, the one or more computing platforms 102, may be communicatively coupled to the remote platform(s) 104. In some cases, the communicative coupling may include communicative coupling through a networked environment 146. The networked environment 146 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 102 and remote platform(s) 104 may be operatively linked via some other communication coupling. The one or more one or more computing platforms 102 may be configured to communicate with the networked environment 146 via wireless or wired connections. In addition, in an embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices. In an embodiment, system 100 may also include one or more hosts or servers, such as the one or more remote platforms 104 connected to the networked environment 146 through wireless or wired connections. According to one embodiment, remote platforms 104 may be implemented in or function as base stations (which may also be referred to as Node Bs or evolved Node Bs (eNBs)). In other embodiments, remote platforms 104 may include web servers, mail servers, application servers, etc. According to certain embodiments, remote platforms 104 may be standalone servers, networked servers, or an array of servers.

The one or more computing platforms 102 may include one or more processors 148 for processing information and executing instructions or operations. One or more processors 148 may be any type of general or specific purpose processor. In some cases, multiple processors 148 may be utilized according to other embodiments. In fact, the one or more processors 148 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 148 may be remote from the one or more computing platforms 102, such as disposed within a remote platform like the one or more remote platforms 148 of FIG. 1.

The one or more processors 148 may perform functions associated with the operation of system 100 which may include, for example, precoding of antenna gain/phase parameters, encoding and decoding of individual bits forming a communication message, formatting of information, and overall control of the one or more computing platforms 102, including processes related to management of communication resources.

The one or more computing platforms 102 may further include or be coupled to a memory 150 (internal or external), which may be coupled to one or more processors 148, for storing information and instructions that may be executed by one or more processors 148. Memory 150 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 150 can consist of any combination of random access memory (RAM), read only memory (ROM), static storage such as a magnetic or optical disk, hard disk drive (HDD), or any other type of non-transitory machine or computer readable media. The instructions stored in memory 150 may include program instructions or computer program code that, when executed by one or more processors 148, enable the one or more computing platforms 102 to perform tasks as described herein.

In some embodiments, one or more computing platforms 102 may also include or be coupled to one or more antennas 152 for transmitting and receiving signals and/or data to and from one or more computing platforms 102. The one or more antennas 152 may be configured to communicate via, for example, a plurality of radio interfaces that may be coupled to the one or more antennas 152. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

FIGS. 2A, 2B, 2C, 2D, 2E, 2F and/or 2G illustrate an example flow diagram for a method 200 for tracking equipment through the use of distributed ledger technologies (e.g., Blockchain) and NFTs, according to one embodiment of the present invention. In a preferred embodiment of the present invention, the method is intended to track a piece of equipment and provide information about the equipment via a variety of means, which may comprise, smart contracts, an NFT, decentralized autonomous organization (DAO) technologies, or any combination thereof. In certain embodiments, the smart contract and/or NFT can maintain information related to the equipment, such as service history, maintenance history, operational history, efficiency, sensor data, failure data, or any combination thereof.

In certain embodiments, sensors used on the equipment may transfer data to the system and provide critical information about the equipment. Sensors may include, but are not limited to, temperature sensors, voltage sensors, amperage sensors, mechanical checkpoint sensors, energy performance sensors, time of use sensors, or any combination thereof. Sensors may be Internet of Things (IoT) devices, or otherwise able to transmit data to the system for the purposes of sending and/or receiving data. One of ordinary skill in the art would appreciate that there are numerous types of sensors that could be utilized with embodiments of the present invention, and embodiments of the present invention are contemplated for use with any appropriate type of sensor.

In certain embodiments of the present invention, one or more DAOs may be used to ensure fair and balanced inputs for an associated marketplace or system for tracking the equipment. As DAOs offer a decentralized management/operation, the likelihood of data related to the equipment, or overall market data (e.g., second hand equipment pricing) is potentially more reliable and trustworthy than if otherwise run by a conventional business. However, embodiments of the present invention would work, even if operated by a conventional business.

In various embodiments, the systems and methods depicted herein may utilize various machine learning (ML) and/or artificial intelligence (AI) systems, including, but not limited to, machine learning models trained on various amounts of test and training data, neural networks (e.g., Artificial Neural Networks (ANN), Convolution Neural Networks (CNN), Recurrent Neural Networks (RNN)), deep learning models and deep-learning-based generative models (e.g., generative adversarial networks (GANs)). One of ordinary skill in the art would appreciate that there are numerous types of ML and AI systems that could be used for the purposes detailed herein, and embodiments of the present invention are contemplated for use with any such ML or AI system.

Figure 2A:
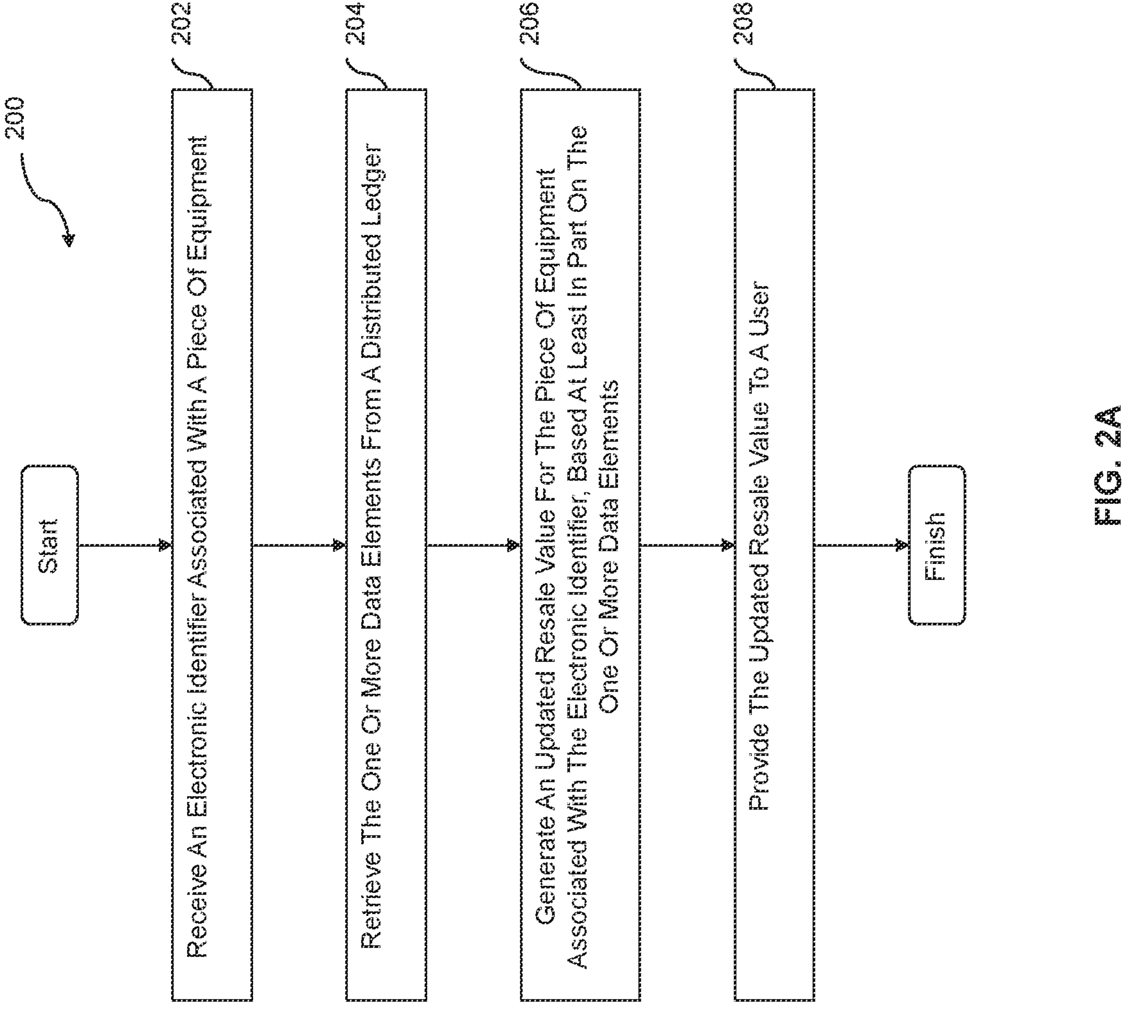
FIGS. 2A, 2B, 2C, 2D, 2E, 2F and/or 2G illustrate a method for tracking equipment through the use of distributed ledger technologies and electronic identifiers, such as NFTs, in accordance with an embodiment of the present invention.

Returning to the method of FIG. 2A, the method 200 may include receiving an electronic identifier associated with a piece of equipment at block 202, the electronic identifier comprising information associated with one or more data elements selected from a set of data elements comprising, a service history, input from one or more equipment sensors, equipment performance data, abnormality alert data, equipment breakdown data, and a smart contract data. The method 200 may include retrieving the one or more data elements from a distributed ledger at block 204. The method 200 may include generating an updated resale value for the piece of equipment associated with the electronic identifier, based at least in part on the one or more data elements at block 206. The method 200 may include providing the updated resale value to a user at block 208.

In certain embodiments of the present invention, the generation of the updated resale value for the piece of equipment may utilize certain AI/ML means and methods, as detailed elsewhere herein. For instance, test and training data may be utilized to improve machine learning pricing models for various pieces of equipment, and as more and more sales/pricing data is incorporated into the system, the generation of updated resale value for the piece of equipment may become more accurate and true to an objective resale value. This will, in turn, improve the resale process for the equipment, as both buyer and seller will have accurate knowledge of the fair market value for the equipment.

Figure 2B:
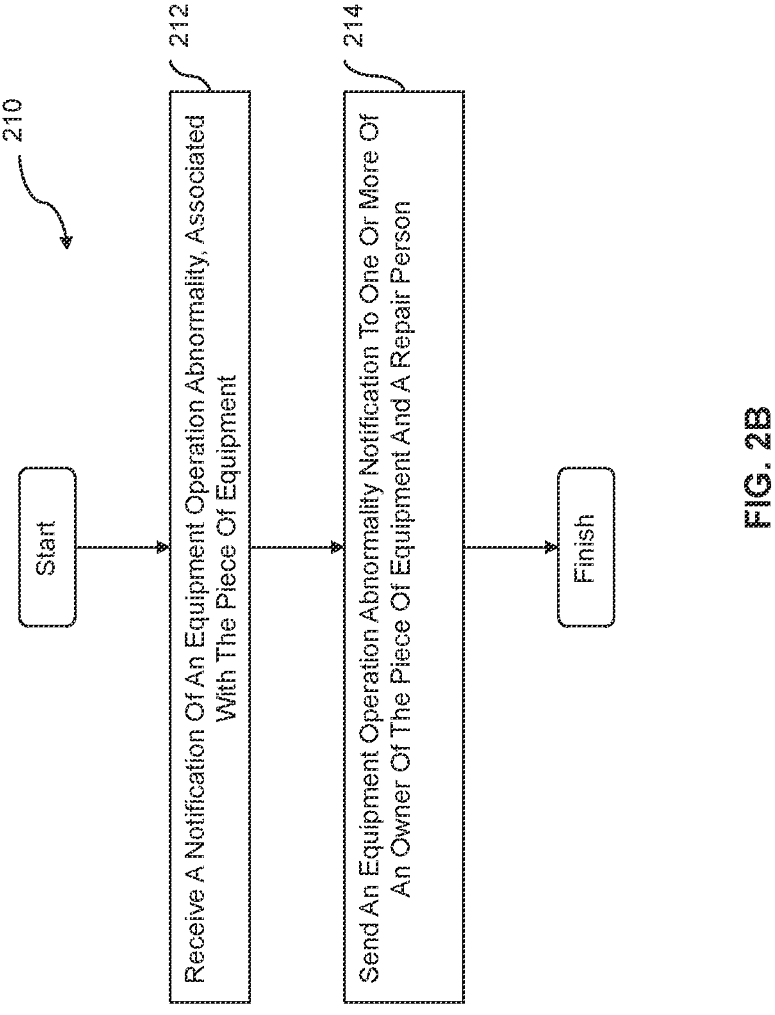

In FIG. 2B, the method 200 may be continued at 210, and may further include receiving a notification of an equipment operation abnormality, associated with the piece of equipment at block 212. The method 200 continued at 210 may also further include sending an equipment operation abnormality notification to one or more of an owner of the piece of equipment and a repair person at block 214. In certain embodiments of the present invention, the provision of an equipment operation abnormality notification is useful in several regards. First, it lets the current owner know of the abnormality, and allows the owner to take corrective or preventive action in relation to the abnormality. Second, since the data is recorded by the system, the information will be available for potential future purchasers of the equipment to utilize.

Figure 2C:
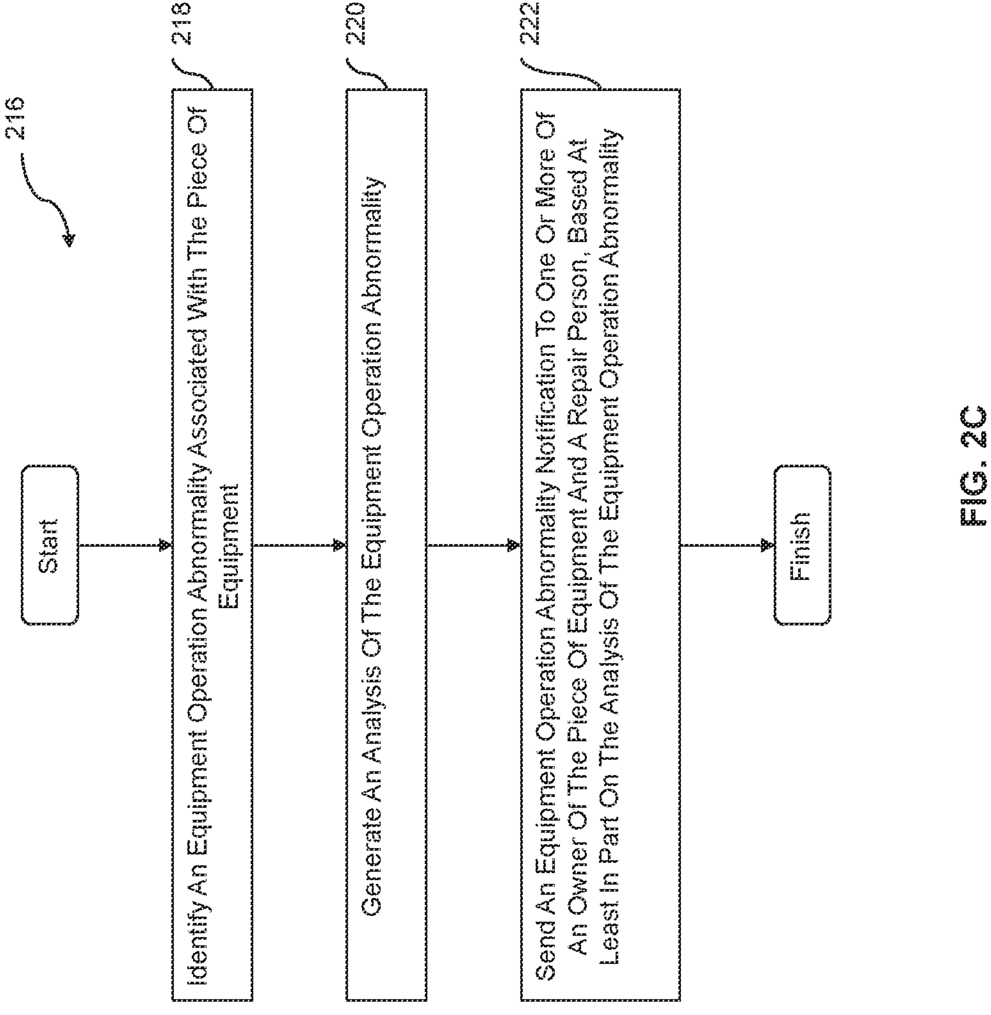

In FIG. 2C, the method 200 may be continued at 216, and may further include identifying an equipment operation abnormality associated with the piece of equipment at block 218. The method 200 continued at 216 may further include generating an analysis of the equipment operation abnormality at block 220. The method 200 continued at 216 may also further include sending an equipment operation abnormality notification to one or more of an owner of the piece of equipment and a repair person, based at least in part on the analysis of the equipment operation abnormality at block 222. An equipment operation abnormality may indicate that the operation of the equipment is compromised or otherwise operating outside of typical parameters. One of ordinary skill in the art would appreciate that the system could automate the deployment of repair personnel to fix or otherwise service equipment. In certain embodiments, the system may utilize certain AI or ML modules to identify the type of repair personnel needed, based at least in part on the type of operation abnormality and/or type of equipment. In other embodiments, the owner/user/operator may setup preferred repair personnel in the system, which would be contacted in response to receipt of an operation abnormality.

Figure 2D:
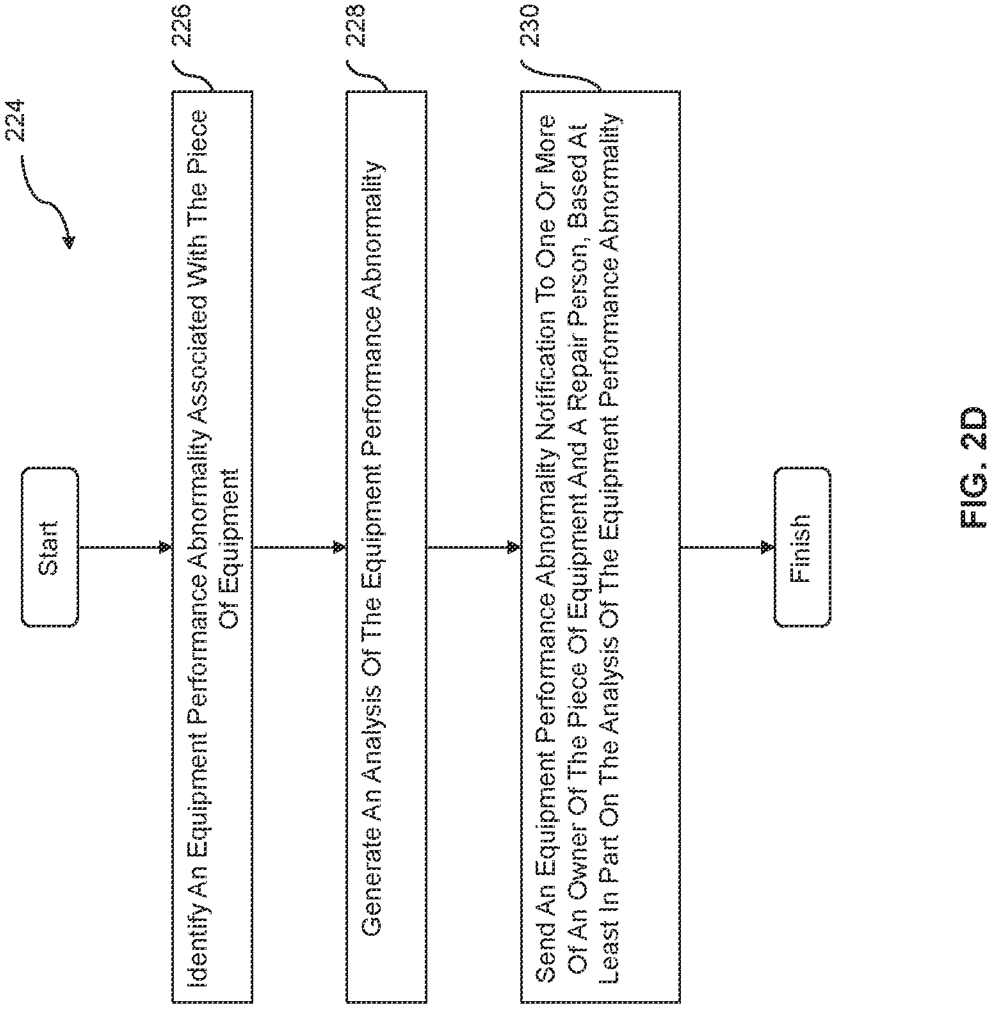

In FIG. 2D, the method 200 may be continued at 224, and may further include identifying an equipment performance abnormality associated with the piece of equipment at block 226. The method 200 continued at 224 may further include generating an analysis of the equipment performance abnormality at block 228. The method 200 continued at 224 may also further include sending an equipment performance abnormality notification to one or more of an owner of the piece of equipment and a repair person, based at least in part on the analysis of the equipment performance abnormality at block 230. A performance abnormality may indicate that the performance of the equipment is compromised, or otherwise performing outside of standard parameters. One of ordinary skill in the art would appreciate that the system could automate the deployment of repair personnel to fix or otherwise service the performance of the equipment. In certain embodiments, the system may utilize certain AI or ML modules to identify the type of repair personnel needed, based at least in part on the performance abnormality and/or type of equipment. In other embodiments, the owner/user/operator may setup preferred repair personnel in the system, which would be contacted in response to receipt of a performance abnormality.

Figure 2E:
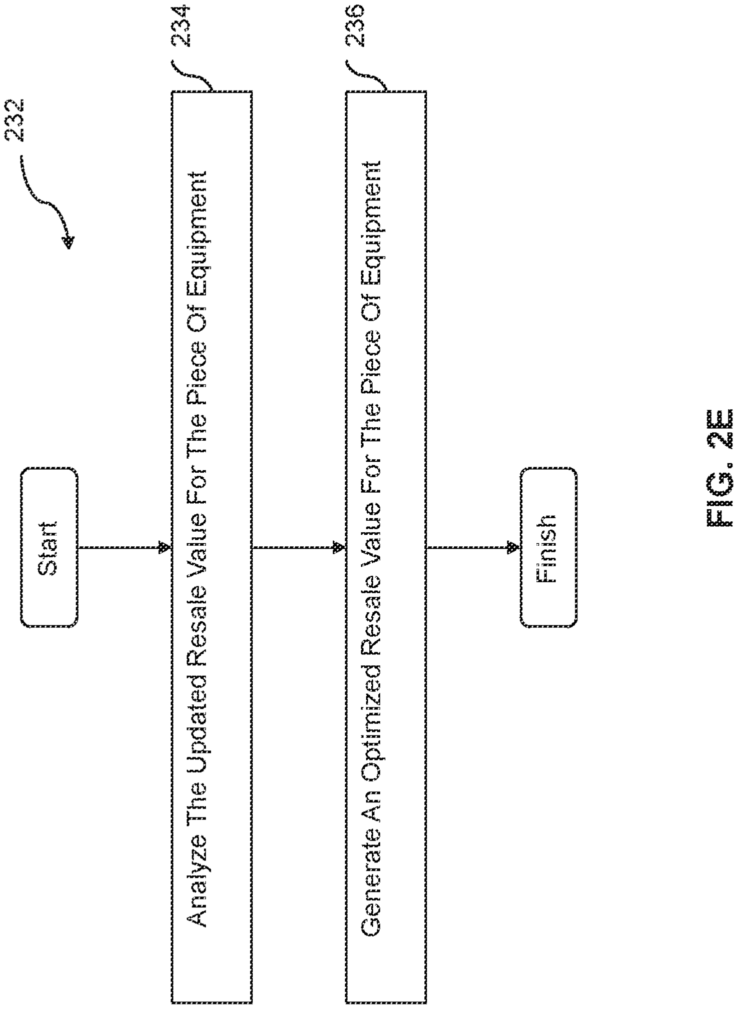

In FIG. 2E, the method 200 may be continued at 232, and may further include analyzing the updated resale value for the piece of equipment at block 234. The method 200 continued at 232 may also further include generating an optimized resale value for the piece of equipment at block 236. As discussed elsewhere herein, the optimized resale value can take into account any number of variables and data points associated with the equipment, such as one or more of, data related to operational abnormalities, data related to performance abnormalities, repair data, service data, other historical data associated with the equipment, pricing and sales data associated with similar equipment, pricing and sales data of the equipment, or any combination thereof. Further, AI or ML systems may be utilized in the process of generating the optimized resale value, such as by way of using ML systems with models trained on datasets of both test and training data, and using the various data points to determine a true optimized resale value for the equipment.

Figure 2F:
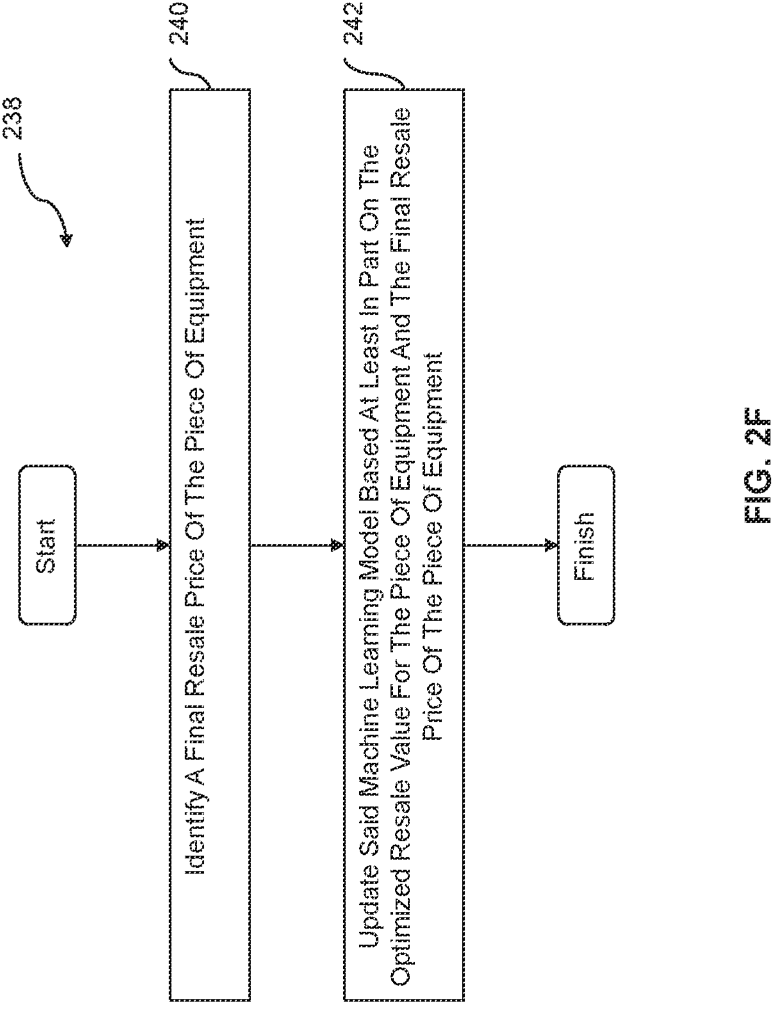

In FIG. 2F, the method 200 may be continued at 238, and may further include identifying a final resale price of the piece of equipment at block 240. The method 200 continued at 238 may also further include updating said machine learning model based at least in part on the optimized resale value for the piece of equipment and the final resale price of the piece of equipment at block 242. As noted previously, by continuing to receive and utilize actual real world data on resales of equipment, the ML models are honed and become better and better over time at providing truly optimal pricing for equipment, based on any number of data points. One of ordinary skill in the art would appreciate how the ML models are continually trained and refined using such data points, and embodiments of the present invention are contemplated for use with such ML models and data points.

Figure 2G:
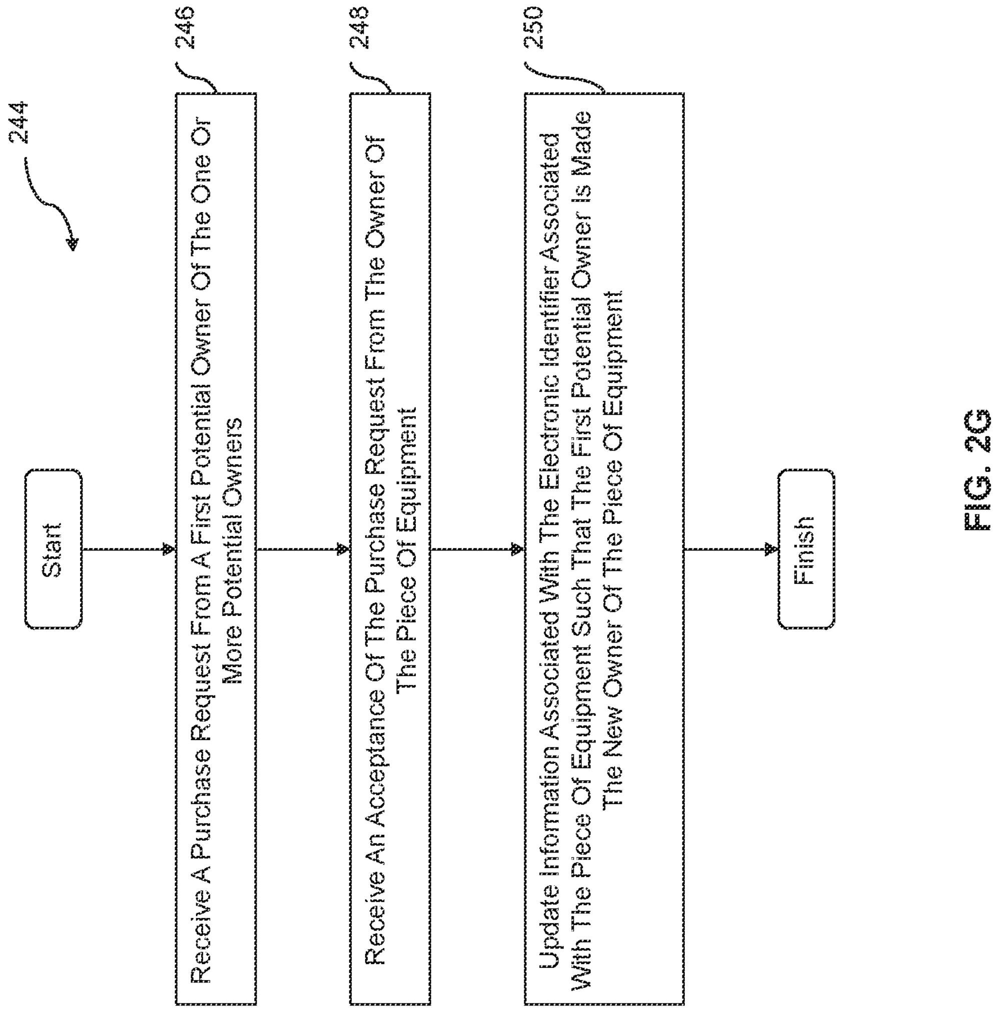

In FIG. 2G, the method 200 may be continued at 244, and may further include receiving a purchase request from a first potential owner of the one or more potential owners at block 246. The method 200 continued at 244 may further include receiving an acceptance of the purchase request from the owner of the piece of equipment at block 248. The method 200 continued at 244 may also further include updating information associated with the electronic identifier associated with the piece of equipment such that the first potential owner is made the new owner of the piece of equipment at block 250. In certain embodiments, the electronic identifier may be a NFT, allowing for the ownership of the equipment to be tracked and verified by the NFT.

In certain embodiments, the electronic identifier may be configured to be fractionally owned, or otherwise owned by multiple owners. In these embodiments, depending on the terms of a smart contract associated with the electronic identifier, revenue or other profits, and potentially other costs, may be split amongst the multiple owners. One of ordinary skill in the art would appreciate there are numerous ways this could be structured, and embodiments of the present invention are contemplated for use with any appropriate configuration.

According to an embodiment of the present invention, the systems detailed herein provide for an Equipment as a Service (EaaS) model integrates interests of its users through tangible operational, societal, environmental and economic payback.

In accordance with an embodiment of the present invention, the system may provide a comprehensive equipment maintenance and repair history standard that simultaneously allows manufacturers to reduce research and development expenses while providing new entrants to the market to cost-effectively purchase certified pre-order equipment.

In certain embodiments of the present invention, the system provides for consistent maintenance and repair procedures and accompanying records with a verified transaction record via distributed ledger technologies. These procedures and records establish a true industry market defined by verifiable standards. The system is further configured to allow for equipment installation, and maintenance and repair companies to increase the amount of skilled labor in the market by recruiting new entrants, rapidly and securely training those entrants, and professionally developing the entrants against established standards provided for by embodiments of the present invention. This, and embodiments of the present invention allow for fewer trips to a jobsite, as the system will pre-identify potential issues with the equipment, ensuring that service or repair personnel have the appropriate parts on hand to do the service/repair in a single trip.

In certain embodiments of the present invention, issuance of NFT's allows manufacturers, equipment users, and installation, maintenance and repair service providers to earn income on business functions historically transacted as pure costs.

According to certain embodiments of the present invention, incentives for customer to engage in a subscription program presented by the system include, but are not limited to: business continuity and optimal equipment uptime; and lower subscription costs.

According to certain embodiments of the present invention, incentives for customers keeping the same brand/manufacturer of equipment they currently have include, but are not limited to: additional revenue on equipment resales value; and lower costs for replacements or addition of new equipment from the same manufacturer.

According to certain embodiments of the present invention, incentives for business licensees (i.e., installation & maintenance service providers) include, but are not limited to: additional service revenues; higher equipment resale values; locked in service and maintenance programs associated with particular equipment; increased ownership rights in an NFT if installation of equipment is finished according to a project timeline/pass customer accept acceptance inspection; and increased ownership rights in an NFT if all the timely services are done properly according to SOP standard and service data is captured accurately in the system.

According to certain embodiments of the present invention, incentives for manufacturers include, but is not limited to: integration of their equipment with the system may provide increased ownership in an NFT for every equipment of their make/model; access to all equipment service history to improve the equipment quality and design for the manufacturer's equipment; and increased ownership rights in an NFT bases on one or more of, lowest #of repairs and cost of the repairs over a period of time, technician survey feedbacks on the equipment, customer/end users' survey on the equipment.

According to certain embodiments of the present invention, incentives for secondhand equipment buyers include, but are not limited to: access to system's platform and data related to the equipment; access to the equipment's estimated resale value and service history which is associated with an NFT bundle; ability to own the equipment with its history (e.g., stored on an NFT); improved future customer service, which may be backed up by manufacturers' equipment catalogue; discounts on an NFT given if the buyer introduces the new customers and service companies to the system's platform and eco-system.

According to certain embodiments of the present invention, incentives for any service providers to become business licensee & trusted user include, but is not limited to: increased amount of work for installing and servicing of used equipment; and access to all the benefits of data of the system, including equipment catalogues and parts marketplace.

According to certain embodiments of the present invention, incentives for integrating a user's platform with the system, including providing service data to the system may include, but is not limited to: earning utility tokens; gaining access to tracking of equipment chain of title back to manufacture date; and payment clearance process back by BUSD.

In some cases, the method 200 may be performed by one or more hardware processors, such as the processors 148 of FIG. 1, configured by machine-readable instructions, such as the machine-readable instructions 106 of FIG. 1. In this aspect, the method 200 may be configured to be implemented by the modules, such as the modules 108, 110, 112, 114, 116, 118, 120, 122, 124, 126, 128, 130, 132, 134, 136, 138, 140, 142 and/or 144 discussed above in FIG. 1.

In certain embodiments, the system may provide methods of use whereby the equipment is offered via a subscription service. In these embodiments, a user may sign up for an equipment subscription service, and the system will provide the equipment to the user and use the sensor data and/or other data to provide a service schedule for the equipment. Service scheduling may not only be routine or preventative maintenance for the equipment, but also may be on demand servicing when needed (e.g., abnormalities reported from sensors), or predictive maintenance provided by machine learning systems trained on data models related to the equipment. In certain embodiments, the service and maintenance records may be stored (e.g., on a DLT like Blockchain). In these subscription related services, the system may be configured to automatically generate and provide for replacement of the equipment with new equipment, and the original equipment being put up for resale, such as in accordance with other methods described herein.

In certain embodiments, the system provides alignment of interests between equipment manufacturers, end-users, service providers for proper execution, use and ongoing care of the equipment: the result is higher resale value benefits for all stakeholders, allowing smaller or new entrants to cost-effectively build successful commercial businesses, such as foodservice businesses.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general-purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A computerized method, comprising:

receiving, at one or more hardware processors, an electronic identifier associated with a piece of equipment, wherein the electronic identifier comprises information associated with one or more data elements selected from a set of data elements comprising: a service history, input from one or more equipment sensors, equipment performance data, abnormality alert data, equipment breakdown data, and smart contract data;

retrieving, via the one or more hardware processors, the one or more data elements from an electronically provided distributed ledger; generating an updated resale value for the piece of equipment associated with the electronic identifier, based at least in part on the one or more data elements;

identifying, via the one or more hardware processors, from at least the input from the one or more equipment sensors, an equipment abnormality associated with the piece of equipment, and generating, via the one or more hardware processors, an analysis of the equipment abnormality;

applying, by the one or more processors, a machine-learning model to (i) the equipment breakdown data, wherein the equipment breakdown data is based at least in part on the equipment abnormality and the analysis of the equipment abnormality, and (ii) a type of the piece of equipment, to identify a type of repair personnel needed to repair the piece of equipment, wherein the machine learning model has been trained using historical equipment breakdown records correlated with completed repair outcomes;

transmitting, via the one or more hardware processors, an electronic dispatch instruction to a repair-dispatch system to automatically cause deployment of repair personnel of the identified type to repair the piece of equipment, recording, on the distributed ledger, a repair completion record associated with the electronic identifier after completion of the repair; and providing, via the one or more hardware processors, the updated resale value to a user.

2. The computerized method of claim 1, wherein the electronic identifier is a non-fungible token.

3. The computerized method of claim 1, further comprising receiving input from one or more equipment sensors selected from the group comprising one or more voltage sensors, one or more amperage sensors, one or more energy sensors, one or more temperature sensors, one or more gas leak sensors, one or more power failure sensors, and one or more time of operation sensors.

4. The computerized method of claim 1, further comprising receiving a notification of an equipment operation abnormality, associated with the piece of equipment; and sending an equipment operation abnormality notification to one or more of an owner of the piece of equipment and a repair person.

5. The computerized method of claim 3, further comprising identifying, from the input from one or more equipment sensors, an equipment operation abnormality associated with the piece of equipment; generating an analysis of the equipment operation abnormality; and sending an equipment operation abnormality notification to one or more of an owner of the piece of equipment and a repair person, based at least in part on the analysis of the equipment operation abnormality.

6. The computerized method of claim 5, wherein the repair person is identified, based at least in part on a type of equipment operation abnormality identified in the analysis of the equipment operation abnormality.

7. The computerized method of claim 1, further comprising: receiving equipment performance data; and identifying, from the equipment performance data, an equipment performance abnormality associated with the piece of equipment;

generating an analysis of the equipment performance abnormality; and sending an equipment performance abnormality notification to one or more of an owner of the piece of equipment and a repair person, based at least in part on the analysis of the equipment performance abnormality.

8. The computerized method of claim 1, further comprising analyzing, via a machine learning model, the updated resale value for the piece of equipment, wherein the machine learning model comprises a data model comprising data points associated with one or more of the group comprising data related to commercial secondary market practices, data related to previous equipment auctions, data related to auction methods, data related to reverse auction methods, data related to performance of other pieces of equipment, and data related to maintenance of other pieces of equipment generating, based at least in part on use of the machine learning model, an optimized resale value for the piece of equipment.

9. The computerized method of claim 8, further comprising identifying a final resale price of the piece of equipment; and updating said machine learning model based at least in part on the optimized resale value for the piece of equipment and the final resale price of the piece of equipment.

10. A computerized method for tracking and trading pieces of equipment, comprising:

receiving, via one or more hardware processors, an electronic identifier associated with a piece of equipment; identifying an electronic smart contract associated with the electronic identifier;

identifying, via said one or more hardware processors, a first owner of the piece of equipment, based at least in part on the electronic identifier;

providing, via said one or more hardware processors, data points to one or more potential owners of the piece of equipment, wherein the data points are identified based at least in part on the electronic identifier, and wherein the data points are selected from a group comprising provenance tracking data, service history data, repair history data, performance data and sensor data, the data points stored on a, distributed ledger;

analyzing, via the one or more hardware processors using a machine learning model, a resale value for the piece of equipment, wherein the machine learning model comprises a data model comprising data points associated with one or more of the group comprising data related to commercial secondary market practices, data related to previous equipment auctions, data related to auction methods, data related to reverse auction methods, data related to performance of other pieces of equipment, and data related to maintenance of other pieces of equipment;

generating, via the one or more hardware processors, based at least in part on use of the machine learning model and the data points, an optimized resale value for the piece of equipment;

providing, via the one or more hardware processors, said optimized resale value to the one or more potential owners of the piece of equipment;

after providing said optimized resale value to the one or more potential owners, receiving a purchase request from a first potential owner of the one or more potential owners, wherein the purchase request comprises an offer to purchase the piece of equipment:

receiving, via the one or more hardware processors, an acceptance of the purchase request from the owner of the piece of equipment; and transferring, via the one or more hardware processors, ownership from the owner of the piece of equipment to the first potential owner according to the smart contract by:

updating via the one or more hardware processors, information associated with the electronic identifier associated with the piece of equipment such that the first potential owner is made the new owner of the piece of equipment, wherein the method further comprises, applying, by the one or more hardware processors, the machine learning model to (i) breakdown data associated with the piece of equipment and (ii) a type of the piece of equipment to identify a type of repair personnel needed to repair the piece of equipment, wherein the machine learning model is trained using historical equipment breakdown records correlated with completed repair outcomes recording, via the one or more hardware processors on the distributed ledger, a repair completion record associated with the electronic identifier after completion of the repair; and transmitting, via the one or more hardware processors, an electronic dispatch instruction to a repair-dispatch system to automatically cause deployment of repair personnel of the identified type to repair the piece of equipment.

11. The computerized method of claim 10, wherein a value associated with the purchase request exceeds the value of one or more other purchase requests received from the one or more potential owners.

12. A computerized system, comprising:

one or more hardware processors and a non-transitory computer-readable medium storing machine-readable instructions that, when executed by the one or more hardware processors, cause the one or more hardware processors to:

receive an electronic identifier associated with a piece of equipment, wherein the electronic identifier comprises information associated with one or more data elements selected from a set of data elements comprising, a service history, input from one or more equipment sensors, equipment performance data, abnormality alert data, equipment breakdown data, and a smart contract data;

retrieve, via electronic communication, the one or more data elements from an electronically provided distributed ledger; generate an updated resale value for the piece of equipment associated with the electronic identifier, based at least in part on the one or more data elements;

identify, from at least the input from the one or more equipment sensors, an equipment abnormality associated with the piece of equipment, and generate an analysis of the equipment abnormality;

apply a machine learning model, trained using historical equipment breakdown records correlated with completed repair outcomes, to (i) the equipment breakdown data, wherein the equipment breakdown data comprises the equipment abnormality and the analysis of the equipment abnormality, and (ii) a type of the piece of e equipment, to identify a type of repair personnel needed to repair the piece of equipment;

transmit an electronic dispatch instruction to cause deployment of repair personnel of the identified type to repair the piece of equipment;

recording, on the distributed ledger, a repair completion record associated with the electronic identifier after completion of the repair; and provide the updated resale value to a user via a network interface.

13. The computerized system of claim 12, wherein the electronic identifier is a non-fungible token.

14. The computerized system of claim 12, wherein the one or more hardware processors are further configured by machine-readable instructions to receive input from one or more equipment sensors, wherein the input from one or more equipment sensors comprises information from sensors selected from the group comprising one or more voltage sensors, one or more amperage sensors, one or more energy sensors, one or more temperature sensors, one or more gas leak sensors, one or more power failure sensors, and one or more time of operation sensors.

15. The computerized system of claim 12, wherein the one or more hardware processors are further configured by machine-readable instructions to: receive a notification of an equipment operation abnormality, associated with the piece of equipment; and send an equipment operation abnormality notification to one or more of an owner of the piece of equipment and a repair person.

16. The computerized system of claim 14, wherein the one or more hardware processors are further configured by machine-readable instructions to: identify, from the input from one or more equipment sensors, an equipment operation abnormality associated with the piece of equipment; generate an analysis of the equipment operation abnormality; and send an equipment operation abnormality notification to one or more of an owner of the piece of equipment and a repair person, based at least in part on the analysis of the equipment operation abnormality.

17. The computerized system of claim 16, wherein the repair person is identified, based at least in part on a type of equipment operation abnormality identified in the analysis of the equipment operation abnormality.

18. The computerized system of claim 12, wherein the one or more hardware processors are further configured by machine-readable instructions to: receive equipment performance data; and identify, from the equipment performance data, an equipment performance abnormality associated with the piece of equipment; generate an analysis of the equipment performance abnormality; and send an equipment performance abnormality notification to one or more of an owner of the piece of equipment and a repair person, based at least in part on the analysis of the equipment performance abnormality.

19. The computerized system of claim 12, wherein the one or more hardware processors are further configured by machine-readable instructions to: analyze, via a machine learning model, the updated resale value for the piece of equipment, wherein the machine learning model comprises a data model comprising data points associated with one or more of the group comprising data related to commercial secondary market practices, data related to previous equipment auctions, data related to auction systems, data related to reverse auction systems, data related to performance of other pieces of equipment, and data related to maintenance of other pieces of equipment generate, based at least in part on use of the machine learning model, an optimized resale value for the piece of equipment.

* * * * *